United States Patent [19]
Hall

[11] Patent Number: 5,090,141
[45] Date of Patent: Feb. 25, 1992

[54] ADJUSTABLE BLADE HOLDER

[76] Inventor: Ronald H. Hall, 161 Argyle Street, Embro, Ontario, Canada, N0J 1J0

[21] Appl. No.: 602,774

[22] Filed: Oct. 24, 1990

[51] Int. Cl.⁵ ............................ A01B 3/64; E02F 5/02
[52] U.S. Cl. ......................................... 37/98; 37/193; 405/181; 172/744
[58] Field of Search .................... 37/98, 193; 405/180, 405/181; 172/464, 483, 744

[56] References Cited

U.S. PATENT DOCUMENTS

| | | | |
|---|---|---|---|
| 304,776 | 9/1884 | Barnes | 405/181 |
| 3,041,751 | 7/1962 | Chattin | 37/98 |
| 3,611,596 | 10/1971 | Bright et al. | 37/193 |
| 3,777,500 | 12/1973 | Kelly | 405/180 |
| 4,219,947 | 9/1980 | Paladino | 37/193 |

FOREIGN PATENT DOCUMENTS 386095  9/1973  U.S.S.R. ................................ 39/98

Primary Examiner—Randolph A. Reese
Assistant Examiner—Arlen L. Olsen
Attorney, Agent, or Firm—Craig Armstrong

[57] ABSTRACT

The invention provides automated adjustment of the height of a trenching blade. There is a blade holder having a generally vertical channel defined therein, and support means for carrying the blade holder behind a vehicle at a height above the ground. A trenching blade for dragging through the ground behind the vehicle has a shank portion extending upwardly therefrom into the channel and slidably engaging in the channel for vertical movement therewithin, whereby the depth of the blade may be varied. At least one hydraulic cylinder is connected between the blade holder and the blade shank for varying the position of the blade shank within the blade holder and thereby varying the depth of the blade. In the preferred embodiment, the support means is at the end of a boom which is pivotally connected to the vehicle for pivotal movement about a generally vertical axis, and the blade holder is pivotally mounted to the support means, for pivotal movement about a generally vertical axis. There is additionally at least one hydraulic cylinder connected between the blade holder and the support means for varying the angle in the horizontal plane between the blade holder and the support means, whereby the angle of the trenching blade may be varied to steer the movement of the blade through the ground.

6 Claims, 4 Drawing Sheets

ADJUSTABLE BLADE HOLDER

BACKGROUND OF THE INVENTION

1. Field of the invention

This invention relates generally to trenching equipment and more particularly to holders for plow blades of the type used to rip a trench for the laying of cable, drainage pipe or other items.

2. Description of the Prior Art

The blades of prior art plows, trenchers, rippers and the like are generally connected behind a tractor at a fixed height, such that they may be forced along a path through the ground to generate a cut of fixed depth in the ground. Manual adjustment of the height of the blade is known. In U.S. Pat. No. 4,219,947 and corresponding Canadian patent no. 1,075,479, for example, a blade dog pivotally mounted on the blade holder is provided to lock the blade in the holder at selected heights by virtue of complementary recesses formed in the blade shank at various heights.

Manual adjustment in the prior art requires significant expenditures of time and effort in order to adjust the height of blade.

In some equipment, the height of the blade holder can be varied by moving the boom which supports the blade holder. However, this is an undesirable way of adjusting the height of the blade, since it is important for maximum pulling power and efficiency that the boom should be essentially horizontal.

There is thus a need for apparatus which would permit the height of the blade with respect to the blade holder, and thus the depth of the trench, to be varied readily by the operator, preferably from within the tractor cab.

SUMMARY OF THE INVENTION

It is thus an object of the invention to provide automated adjustment of the height of the blade.

The invention yields an improved apparatus for adjusting the height of a tranching blade in trenching equipment. Desirable attributes of the invention include obviation of the need to remove the blade or any related parts in order to reset its height, thereby enabling height adjustments to be made by the vehicle operator from a position remote from the blade, and a significant reduction of the time required to make adjustments to the blade height, which enables changes in depth of a ground cut to be made more readily and more economically than can be done using devices of the prior art.

In the invention, there is a blade holder having a generally vertical channel defined therein, and support means for carrying the blade holder behind a vehicle at a height above the ground. A trenching blade for dragging through the ground behind the vehicle has a shank portion extending upwardly therefrom into the channel and slidably engaging in the channel for vertical movement therewithin, whereby the depth of the blade may be varied. Actuation means, preferably in the form of a least one hydraulic cylinder, is connected between the blade holder and the blade shank for varying the position of the blade shank within the blade holder and thereby varying the depth of the blade.

In the preferred embodiment, the support means is at the end of a boom which is pivotally connected to the vehicle for pivotal movement about a generally vertical axis, and the blade holder is pivotally mounted to the support means, for pivotal movement about a generally vertical axis. There is additionally at least one hydraulic cylinder connected between the blade holder and the support means for varying the angle in the horizontal plane between the blade holder and the support means, whereby the angle of the trenching blade may be varied to steer the movement of the blade through the ground.

Further features of the invention will be described or will become apparent in the course of the following detailed description.

BRIEF DESCRIPTION OF THE DRAWING

In order that the invention may be more clearly understood, the preferred embodiment thereof will now be described in detail by way of example, with reference to the accompanying drawing, in which.

DETAILED DESCRIPTION OF THE PREFERRED EMBODIMENT

Figure 1:
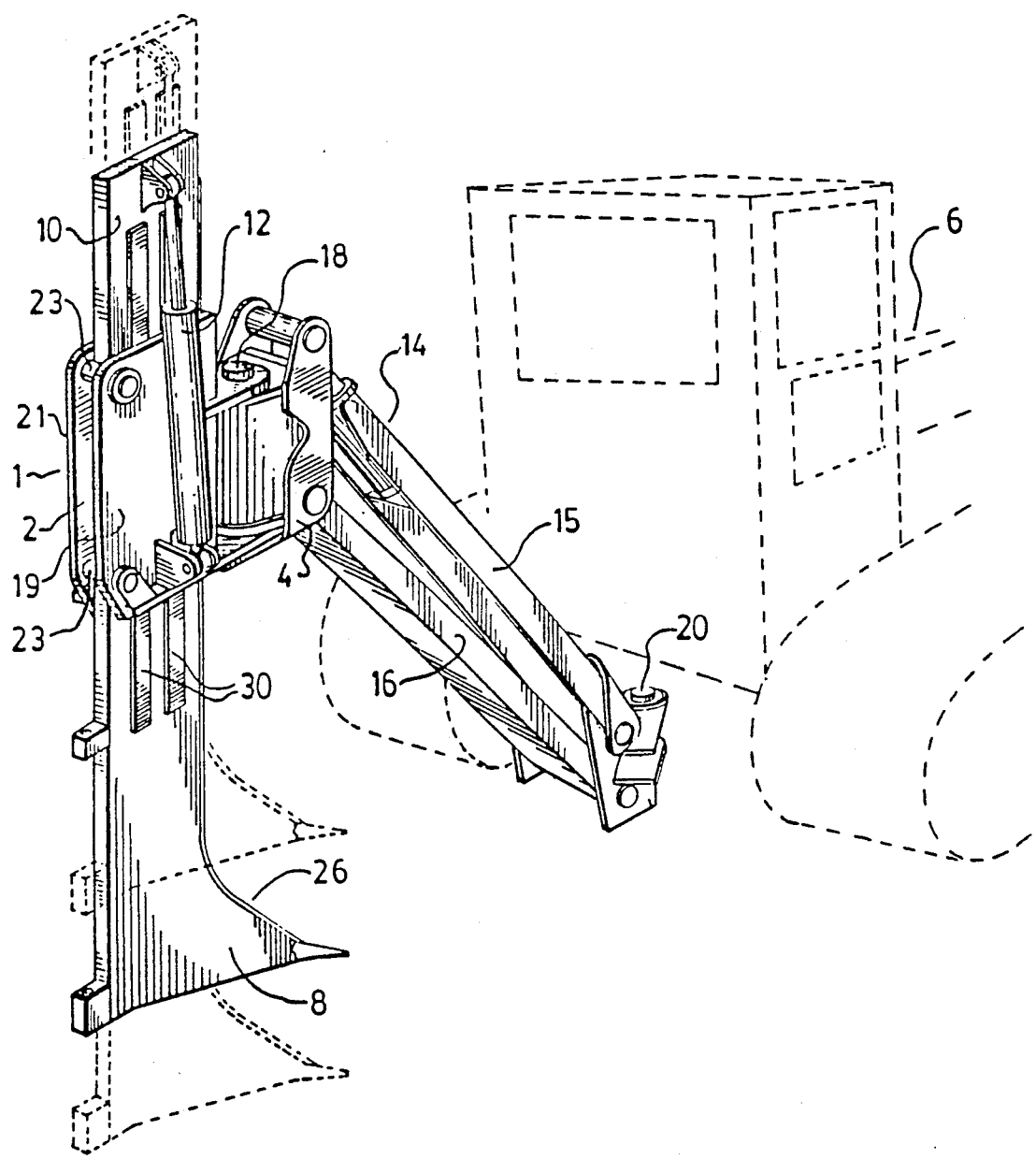
FIG. 1 is perspective view of the preferred embodiment of the blade holder and blade, showing the blade holder mounted on support means at the end of a boom connected to the back of the vehicle.

Referring to FIG. 1, there is a blade holder 1 having a generally vertical channel 2 defined therein, and support means 4 for carrying the blade holder behind a pulling vehicle such as a bulldozer or tractor 6 at a height above the ground. A trenching blade 8 for dragging through the ground behind the vehicle has a shank portion 10 extending upwardly therefrom into the channel and slidably engaging in the channel for vertical movement therewithin, whereby the depth of the blade may be varied. Actuation means, preferably in the form of a least one hydraulic cylinder 12, is connected between the blade holder and the blade shank for varying the position of the blade shank within the blade holder and thereby varying the depth of the blade.

In the preferred embodiment, the support means 4 is at the end of a boom assembly 14 including upper and lower linkage arms 15 and 16 respectively. The boom is raisable and lowerable via a hydraulic lift cylinder or cylinders (not shown) between the transport position shown in FIG. 1 and an operating position in which the link arms 15, 16 preferably are approximately horizontal for maximum pulling power and efficiency. The boom is pivotally connected to the vehicle 6 for pivotal movement about a generally vertical axis, though it is lockable as desired for travelling, for example, and the blade holder 2 is pivotally mounted to the support means, for pivotal movement about a generally vertical axis. The blade holder pivots with respect to the support means about the pivot pin 18. The boom pivots with respect to the vehicle about pivot pin 20. The boom can be locked for travel so that it is not free to pivot.

The blade holder has first and second side plates 19, 21 spaced apart opposite each other in parallel vertical planes by an end piece 22 at the forward end of the plates. The channel 2 is thus defined by the plates. Guide pins 23 force the blade shank 10 to ride against a guide rail 24 having a V-shaped notch 25 therein corresponding to the V-shaped leading edge 26 of the trenching blade.

The blade shank has two bearing plates 30 on the sides bearing against the inside of the side plates 19, 21, to reduce the overall surface area in contact with the side plates. Grease is applied as a lubricant.

Figure 6:
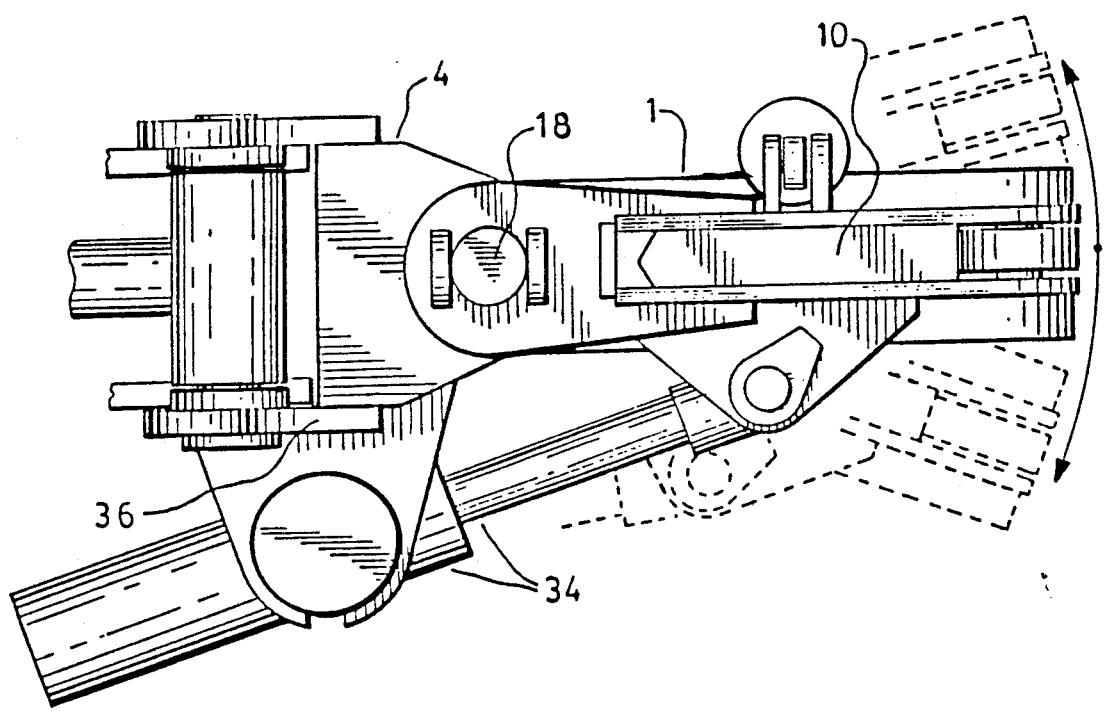
FIG. 6 is a top view of the blade holder and support means.

In the preferred embodiment, as illustrated in FIG. 6, there is additionally at least one hydraulic cylinder 34 connected between the blade holder 2 and the support means 4, for varying the angle in the horizontal plane between the blade holder and the support means, whereby the angle of the trenching blade may be varied to steer the movement of the blade through the ground. This cylinder is connected between the far side piece 36 of the support means 4 and a pin positioned in the holes 38 in the flanges 40 on the second side plate 21 of the blade holder.

Figure 2:
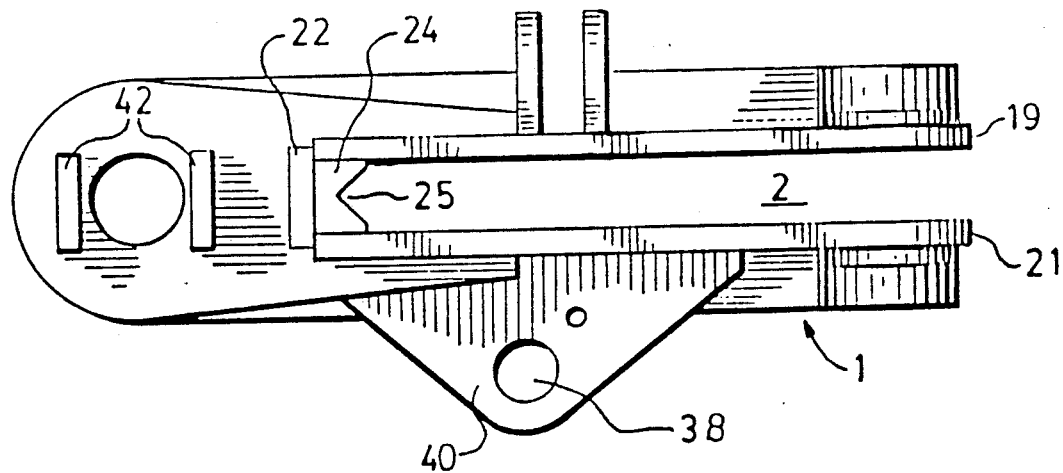
FIG. 2 is a top view of the blade holder.
Figure 3:
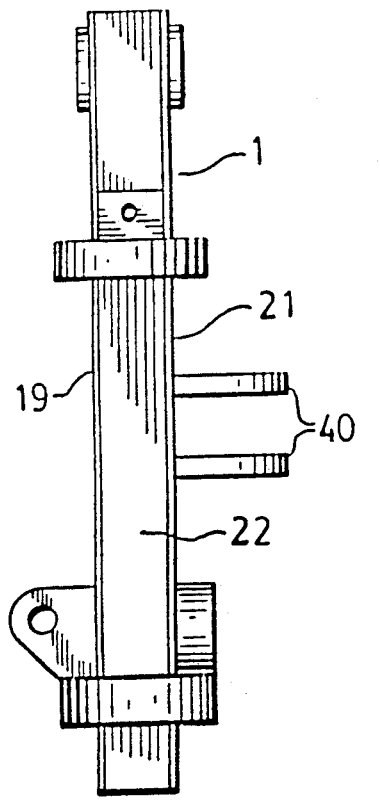
FIG. 3 is an elevation view of blade holder, from the direction of the tractor.
Figure 4:
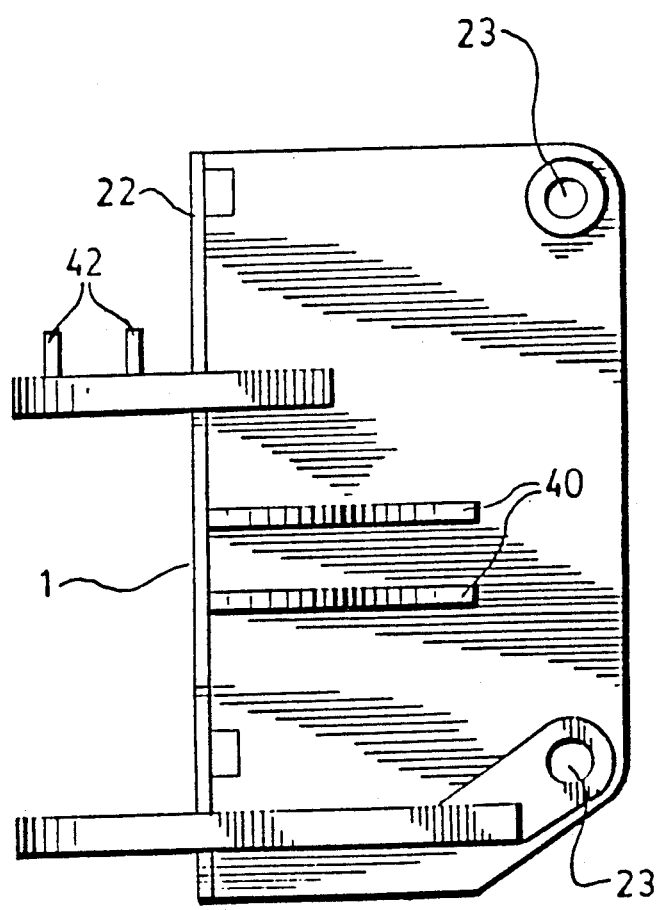
FIG. 4 is a side view of the blade holder.
Figure 5:
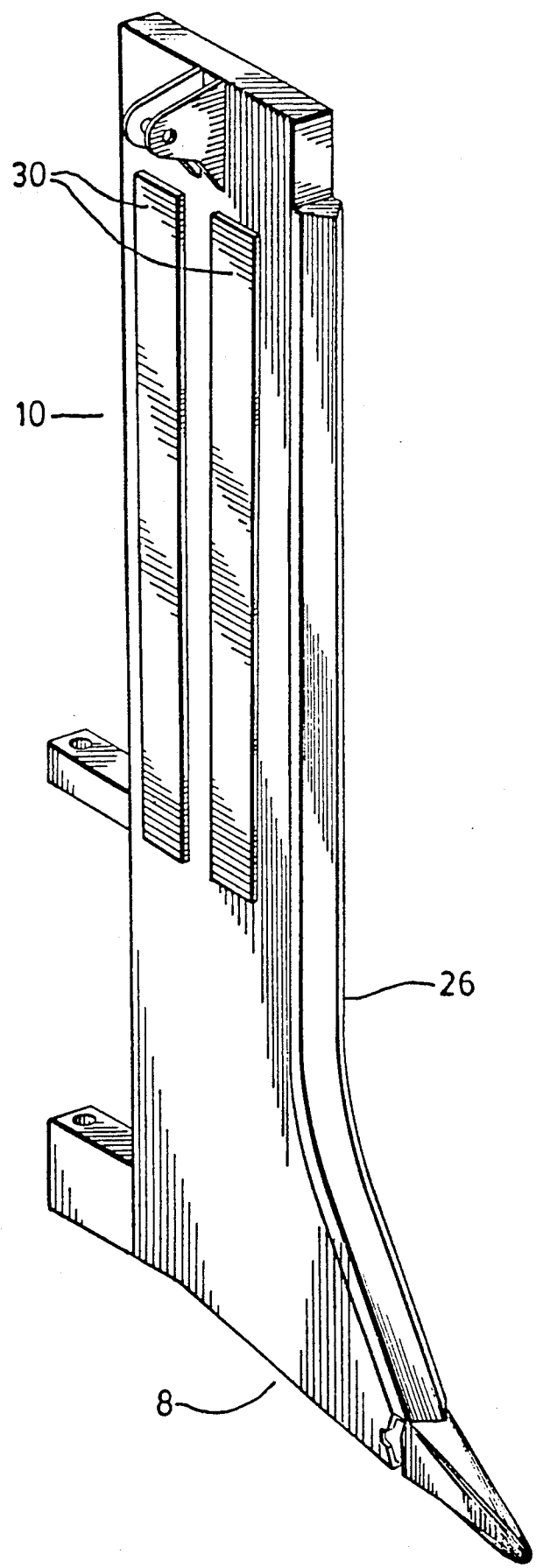
FIG. 5 is a perspective view of a blade used in conjunction with the preferred embodiment.

Referring to FIGS. 2 and 4, the upper pivot plate has two stop blocks 42 extending upwardly from the uppermost face of the upper pivot plate adjacent the aperture defined by the upper pivot plate. The stop blocks serve as stops to prevent excess travel of the blade holder with respect to the support means.

Actuating the cylinder 34 changes the angle of the blade holder with respect to the support means in the horizontal plane, and because the boom assembly is free to swing, this permits the operator to steer the blade around rocks, tree stumps or other obstacles.

In the tractor cab, the operator thus has hydraulic controls which give full control over the operation of the trenching blade, i.e. the boom assembly can be raised and lowered between the travelling and operating positions, the blade itself can be raised and lowered within the blade holder, and the blade can be steered by use of the cylinder 34.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, one obvious variation would be to employ two hydraulic cylinders instead of one for raising and lowering the blade, namely one cylinder positioned on each side of the blade holder.

It will be appreciated that the present invention not only provides automated adjustment of the height of the blade, but also facilitates removal of the blade for maintenance, repair or replacement, since all that is required is that the blade shank be disconnected from the hydraulic cylinder(s).

What is claimed as the invention is:

1. Trenching apparatus comprising:
   a blade holder having a generally vertical channel defined therein;
   support means for carrying said blade holder behind a vehicle at a height above the ground;
   a trenching blade for dragging through the ground behind said vehicle, said blade having a shank portion extending upwardly therefrom into said channel and slidably engaging in said channel for vertical movement therewithin, whereby the depth of said blade may be varied;
   actuation means connected between said blade holder and said blade shank for varying the position of said blade shank within said blade holder and thereby varying the depth of said blade;
   wherein said channel in said blade holder is defined by two generally vertical parallel plates facing each other and spaced apart at a forward aspect thereof by a rail member having a V-shaped notch therein corresponding to a V-shaped leading edge of said trenching blade, and by at least two spaced apart pin members at a rearward aspect thereof.

2. Trenching apparatus as recited in claim 1, wherein said actuation means comprises at least one hydraulic cylinder connected between said blade holder and said blade shank for varying the position of said blade shank within said blade holder and thereby varying the depth of said blade.

3. Trenching apparatus as recited in claim 1, wherein said support means is at the end of a boom which is pivotally connected to said vehicle for pivotal movement about a generally vertical axis, and wherein said blade holder is pivotally mounted to said support means for pivotal movement about a generally vertical axis.

4. Trenching apparatus comprising:
   a blade holder having a generally vertical channel defined therein;
   support means for carrying said blade holder behind a vehicle at a height above the ground;
   a trenching blade for dragging through the ground behind said vehicle, said blade having a shank portion extending upwardly therefrom into said channel and slidably engaging in said channel from vertical movement therewithin, whereby the depth of said blade may be varied, said blade shank having at least one bearing plate on said sides bearing against the inside of said plates; and
   actuation means connected between said blade holder and said blade shank for varying the position of said blade shank within said blade holder and thereby varying the depth of said blade;
   wherein said channel in said blade holder is defined by two generally vertical parallel plates facing each other and spaced apart at a forward aspect thereof by a rail member having a V-shaped notch therein corresponding to a V-shaped leading edge of said trenching blade, and by at least two spaced apart pin members at a rearward aspect thereof.

5. Trenching apparatus as claimed in claim 4, wherein said actuation means further comprises at least one hydraulic cylinder connected between said blade holder and said blade shank for varying the position of said blade shank within said blade holder and thereby varying the depth of said blade.

6. Trenching apparatus as claimed in claim 4, wherein said support means is at the end of a boom which is pivotally connected to said vehicle for pivotal movement about a generally vertical axis, and wherein said blade holder is pivotally mounted to said support means for pivotal movement about a generally vertical axis.

* * * * *